United States Patent
Wu et al.

[19]
[11] Patent Number: 6,134,358
[45] Date of Patent: Oct. 17, 2000

[54] N X N SWITCH ARRAY WITH REDUCED COMPONENTS

[75] Inventors: Kuang-Yi Wu, Plano; Jian-Yu Liu, Garland, both of Tex.

[73] Assignee: Chorum Technologies Inc., Richardson, Tex.

[21] Appl. No.: 09/141,396

[22] Filed: Aug. 27, 1998

[51] Int. Cl.$^7$ .................................................. G02B 6/26
[52] U.S. Cl. ............................... 385/16; 385/11; 385/20; 385/34; 385/36
[58] Field of Search .................. 385/16–23, 11, 385/34, 36

[56] References Cited

U.S. PATENT DOCUMENTS

| | | | |
|---|---|---|---|
| 4,989,941 | 2/1991 | Soref | 350/96.18 |
| 5,596,661 | 1/1997 | Henry et al. | 385/24 |
| 5,680,490 | 10/1997 | Cohen et al. | 385/24 |
| 5,692,077 | 11/1997 | Stone et al. | 385/16 |
| 5,740,288 | 4/1998 | Pan | 385/11 |
| 5,771,320 | 6/1998 | Stone | 385/16 |
| 5,809,190 | 7/1998 | Chen | 385/43 |

OTHER PUBLICATIONS

Inoue, Kyo, Norio Takato, Hiromu Toba and Masao Kawachi; *A Four–Channel Optical Waveguide Multi/Demultiplexer for 5–GHz Spaced Optical FDM Transmission*; Journal of Lightwave Technology; vol. 6, No. 2; Feb. 1988; pp. 339–345.

Kunznetsov, M.; *Cascdded Coupler Mach–Zehnder Channel Dropping Filters for Wavelength–Division–Multiplexed Optical Systems*; Journal of Lightwave Technology; vol. 12, No. 2; Feb. 1994; pp. 226–230.

Nosu, Kiyoshi, Hiromu Tobd and Katsushi Iwashita; *Optical FDM Transmission Technique*; Journal of Lightwave Technology; vol. Lt–5, No. 9; Sep. 1987; pp. 1301–1307.

Takato, Norio; Toshimi Kominato, Akio Sugita, Kaname Jinguji; Hiromu Toba and Masao Kawachi; *Silica–Based Integrated Optic Mach–Zehnder Multi/Demultiplexer Family with Channel Spacing of 0.01–250 nm*; IEEE Journal on Selected Areas in Communications; vol. 8(6), Aug. 1990; pp. 1120–1127.

Verbeek, B.H, C.H. Henry, N.A. Olsson, K.J. Orlowsky, R.F. Kazarinov and B.H. Johnson; *Integrated Four–Channel Mach–Zehnder Multi/Demultiplexer Fabricated with Phosphorous Dopes SiO$_2$ Waveguides on Si*; Journal of Lightwave Technology; Jun. 1988; pp. 1011–1015.

*Primary Examiner*—Hung N. Ngo
*Attorney, Agent, or Firm*—Sheridan Ross P.C.

[57] ABSTRACT

Switch arrays are provided with controllable polarization modifiers and polarization-dependent diverters, such as one or more polarization beam splitters, for configuring switch arrays which can reduce or eliminate the need for optical fibers in the switch arrays. In one embodiment, input positions configured in a first preferably planar (e.g., horizontal) configuration are routed to one or more of a corresponding plurality of output positions which are configured in a different arrangement such as in an orthogonal (e.g., vertical) planar arrangement. Preferably some or all of the polarization-related optical components, including components such as birefringent devices, liquid crystal polarization rotator arrays and/or polarization beam splitters are integrated so that one such device can be used in connection with a plurality of input and/or output beams.

27 Claims, 12 Drawing Sheets

6,134,358

N X N SWITCH ARRAY WITH REDUCED COMPONENTS

Cross-reference is made to U.S. patent application Ser. No. 09/063,611 for "N×M Digitally Programmable Optical Routing Switch" now U.S. Pat. No. 6,049,404 which is a continuation-in-part of Ser. No. 08/979,525 for "1×N Digitally Programmable Optical Routing Switch" filed Nov. 26, 1997 now U.S. Pat. No. 5,946,116, claiming priority from U.S. Provisional Application 60/042,572 entitled "1×$2^N$ Digitally Programmable Optical Routing Switch" filed Apr. 2, 1997, all of which are incorporated herein by reference. Cross-reference is also made to U.S. application Ser. No. 08/685,150 filed Jul. 23, 1996, now U.S. Pat. No. 5,724,165 for "Fault-Tolerant Optical Routing Switch."

GOVERNMENT INTERESTS

The invention was made with Government support under Contract BMDO II: DASG60-98-C-0065 awarded by U.S. Army Space & Missile Defense Command, CONTR & ACQ MGT OFC/SMDC-CM-CK, P.O. Box 1500, Huntsville, Ala. 35807. The Government has certain rights to the invention.

FIELD OF THE INVENTION

The present invention relates to switching of optical signals, and, in particular, to spatial routing of optical signals transmitted in optical communication networks and optical signal processing.

BACKGROUND OF THE INVENTION

Optical fibers are used as the physical media for transmitting optical signals in a variety of commercial and military applications. As the data rates of information continue to grow, it becomes increasingly difficult for conventional electronic switching systems to handle higher bandwidths. In addition, the required conversion between optical and electrical signals restricts the data format and increases costs. All-optical routing/switching technologies, characterized by high "data transparency," can switch or transfer optical signals from one transmission channel to another while the signals remain in optical form. Several multiplexing schemes have been developed in fiber optic interconnection networks, including time-division multiplexing (TDM), wavelength-division multiplexing (WDM) and space-division multiplexing (SDM). Space-division switching is considered to be one of the most important fiber optic routing schemes. Major applications of space-division photonic switches are in fiber optic communication networks, optical gyroscopes, optical signal processing, and micro/millimeter wave signal distribution, e.g., for phased-array radar systems.

A wide variety of electromagnetic field-controlled optical switches are commercially available. They are based on mechanical, electro-optic, thermo-optic, acousto-optic, magneto-optic, and semiconductor technologies. Each switching technology has its own advantages, but also has drawbacks as well. For example, mechanical switches are the most widely used routing components and provide very low insertion loss and crosstalk characteristics, but their switching time is limited to the millisecond range. They also have a limited lifetime because motor-driven parts are used. $LiNbO_3$ optic switches, on the other hand, offer nanosecond switching times. However, $LiNbO_3$ 4×4 switches suffer from the disadvantages of relative large insertion loss (5 dB), high crosstalk (25 dB) and polarization dependency.

Accordingly, efforts continue to develop field-controlled optical switches with lower channel crosstalk, reduced polarization dependent loss, and at least moderate reconfiguration speed. It is recognized that these efforts, when successful, can provide an important component to fiber communication systems.

Optical switches are often assembled from a number of components typically requiring the components to be precisely aligned, coupled, or otherwise positioned. Such assembly has relatively high costs, including high labor costs involved in precision assembly, high material and component costs, high maintenance and repair costs and the like. Accordingly, it would be useful to provide optical switching devices which permit the number or variety of components in such switches to be reduced, in some cases eliminating certain types of components all together.

SUMMARY OF THE INVENTION

Switch arrays are provided with controllable polarization modifiers and polarization-dependent diverters, such as one or more polarization beam splitters, for configuring switch arrays which can reduce or eliminate the need for optical fibers in the switch arrays. In one embodiment, input positions configured in a first preferably planar (e.g., horizontal) configuration are routed to one or more of a corresponding plurality of output positions which are configured in a different arrangement such as in an orthogonal (e.g., vertical) planar arrangement. Preferably some or all of the polarization-related optical components, including components such as birefringent devices, liquid crystal polarization rotator arrays and/or polarization beam splitters are integrated so that one such device can be used in connection with a plurality of input and/or output beams.

DETAILED DESCRIPTION OF THE PREFERRED EMBODIMENT

Figure 1:
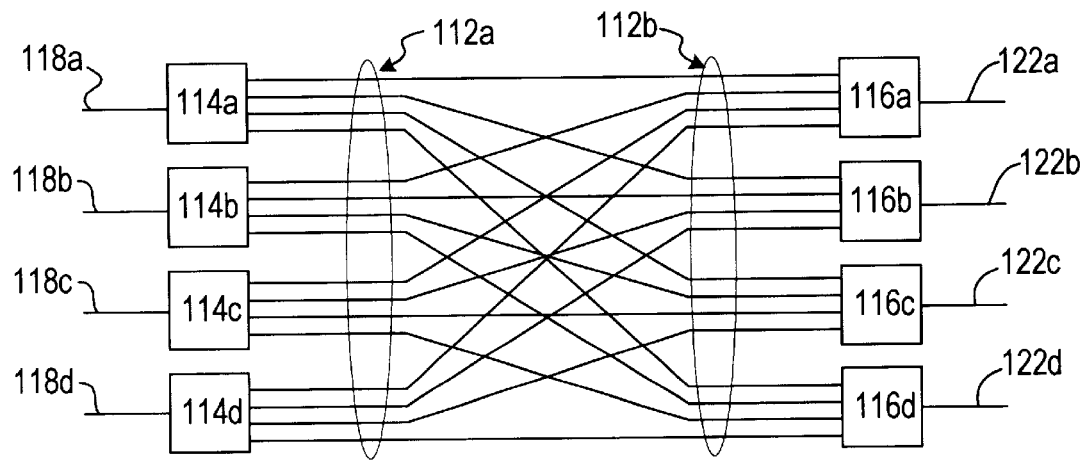
FIG. 1 is a block diagram depicting a 4×4 switch according to previous approaches.

As depicted schematically in FIG. 1, one approach for achieving 4×4 switching function is to use optical fibers 112$a$, 112$b$ to couple the output of a set of four 1-input-4-output devices (denoted 4:1×4) to a set of four 4-input-1-output (4:4×1)devices 116$a,b,c,d$. In this way, by routing the input 118$a, b, c, d$ of any of the first set of devices 114$a$–$d$ to the correct output line, an input signal can be routed to the output line 122$a, b, c, d$ of any desired one of the output devices 116$a$–$d$. To achieve complete functionality of such a device, an N×N switch requires $N^2$ fibers. Thus, the number of optical fibers in such devices can become unwieldy and economically or practically infeasible when N becomes large. One aspect of the present invention involves the reduction or elimination of optical fibers and, instead, preferably achieves N×N switching in the absence of such fibers.

Figure 2:
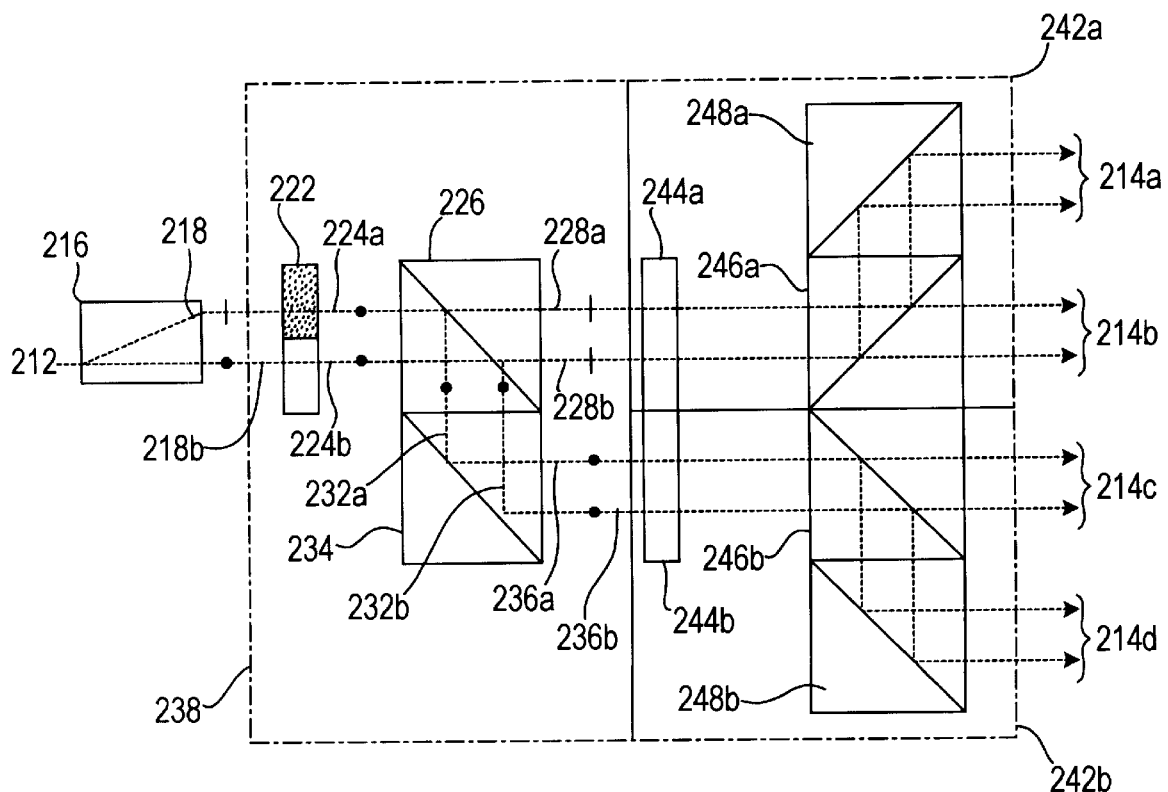
FIG. 2 is a schematic plan view of a 1×4 device usable according to an embodiment of the present invention.

FIG. 2 depicts a 1×4 device, according to one embodiment of the present invention, which receives a first optical input 212 and output 4 signal pairs 214$a,b,c,d$ in a predetermined spatial relationship, preferably evenly spaced and preferably linear (e.g. in the plane of the paper, in the view of FIG. 2). In the device of FIG. 2, the input signal 212 passes through a birefringent element 216 which, in one embodiment, is a calcite crystal which decomposes the light beam into two spaced-apart components 218$a,b$ having orthogonal polarizations (e.g., a vertical polarization depicted by a dot and horizontal polarization depicted by a short line in FIG. 2). The first and second components 218$a$, 218$b$ respectively pass through first and second pixels of a 2-pixel liquid crystal array 222. Each pixel of the array can be in either an active state or an inactive state. The active state provides polarization rotation and accordingly, in the state depicted in FIG. 2 (with the upper pixel active), the upper beam has its polarization rotated so that both beams have the same polarization (verticall in the configuration of FIG. 2) upon exiting the liquid crystal array 222. Preferably the liquid crystal array 222 is configured such that the pixels of the pixel pair are always in opposite states (only one of each pixel pair is active at any time). Thus, if the liquid crystal array 222 is configured in a second state, both beams exiting the liquid crystal array 222 would have a horizontal polarization.

The beams 224$a,b$ exiting the liquid crystal array 222 are provided to a polarization beam splitter (PBS) 226. The polarization beam splitter is configured such that when the light entering the polarization beam splitter 226 is vertically polarized (as depicted in FIG. 2), the beams will be deflected such as being deflected 90° downward 232$a,b$ where another polarization beam splitter (or prism) 234 is positioned and configured to redirect any such beams by 90° to provide output beams 236$a,b$, and if the input beams are horizontally polarized (e.g., as a result of switching the state of the liquid crystal array 222, as described above), such light will pass straight through the polarization beam splitter 226 to provide first and second output beams 228$a,b$.

The approach of using the combination of a beam displacer (birefringent element) such as calcite 216, and PBS's 226 is believed to provide the advantage of making it relatively easy to separate (and recombine) polarizations, and to have a relatively short coupling distance. It would be possible to use PBS's alone (without a separate beam displacer such as calcite) to separate (and recombine) polarizations, but it is believed this approach, while operable, may present particularly difficult alignment problems. It would also be possible to use beam displacers, such as calcite, alone (e.g. without a PBS) e.g. to route the polarized beams, but it is believed this approach, while operable, would result in relatively long coupling distances (and relatively high loss).

As can be seen from FIG. 2, the net effect of the first splitting stage 238 is a controllable 1×2 device to position a pair of output beams in a first spatial location 228$a$, 228$b$ when the LC device 222 is in a first state or in a second position 236$a$, 236$b$ when the LC device 222 is in the opposite state.

As further shown by FIG. 2, it is possible to position second splitting stages 242$a$, 242$b$ along each of the possible output paths from the first stage so that any of four output positions can be selected. As depicted, the output beam pair 228$a$, 228$b$ can be positioned (depending on the selected state of a controllable second LC pixel 244$a$) to either pass through a PBS 246$a$ to a first output beam location 214$b$, or be deflected to a PBS 248$a$ for positioning the output beam to a second output beam location 214$a$. Similarly, the third splitter 242$b$ can be used to configure the third LC pixel 244$b$ to receive the output beam pair in the second location 236$a$, 236$b$ and either pass it straight through a third PBS 246$b$ to a third output position 214$c$ or deflected to a prism 248$b$ for positioning the output beam to a fourth position 214$d$.

If desired, additional splitting stages can be used for increasing the number of output positions. For example, by placing another splitting stage, similar to those depicted 238, 242$a$, 242$b$ adjacent each of the four outputs 214$a,b,c,d$, the output beam pair can be positioned in any of eight output positions.

Figure 3:
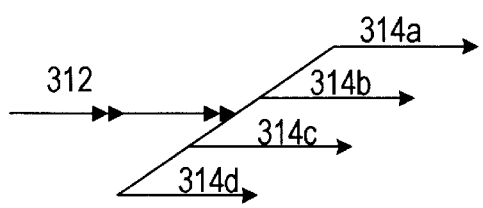
FIG. 3 is a schematic depiction of a 1×4 switch of FIG. 2.

The 1×4 device of FIG. 2 can be represented in a schematic tree fashion as depicted in FIG. 3 showing a single input 312 and four possible output paths 314$a$, 314$b$, 314$c$, 314$d$. Although an embodiment of the present invention will be disclosed in connection with the 1×N device of FIG. 2, other 1×N devices, at least some of which are suitable for use in connection with the present invention, are depicted and described in U.S. patent application Ser. No. 09/063,611 for "N×M Digitally Programmable Optical Routing Switch" which is a continuation-in-part of Ser. No. 08/979,525 for "1×N Digitally Programmable Optical Routing Switch" filed Nov. 26, 1997, claiming priority from U.S. Provisional Application 60/042,572 entitled "1×$2^N$ Digitally Programmable Optical Routing Switch" filed Apr. 2, 1997, all of which are incorporated herein by reference. Cross-reference is also made to U.S. application Ser. No. 08/685,150 filed Jul. 23, 1996, now U.S. Pat. No. 5,724,165 for "Fault-Tolerant Optical Routing Switch."

Figure 4:
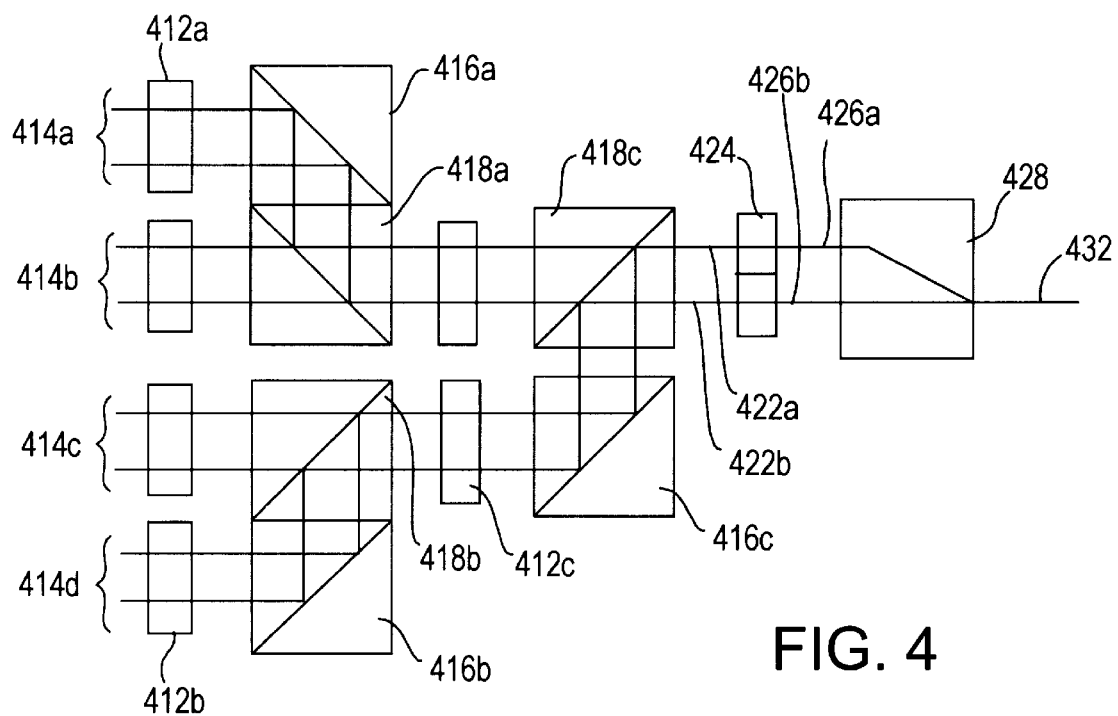
FIG. 4 is a schematic plan view of a 4×1 device according to an embodiment of the present invention.
Figure 5:
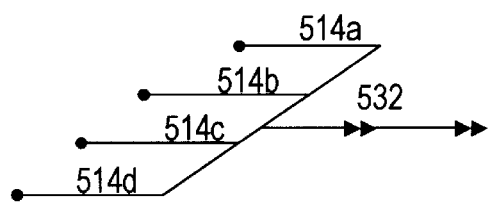
FIG. 5 is a schematic depiction of a 4×1 switch of FIG. 4.

As depicted in FIG. 4, a 4×1 device can be configured so as to control controllable polarization rotators 412$a,b,c$ such that regardless of which of four possible input positions for 414$a,b,c,d$ an input beam pair is received at, the net effect of prisms 416$a,b,c$ and polarization beam rotators 418$a,b,c$ will be provide an output beam pair in a single predetermined path 422$a$, 422$b$. The output beam pair, being thus located, is provided to a pixel pair LC device 424 controlled to restore the relative orthogonal polarization of the output beams 426a, 426b so that a calcite crystal 428 or similar device will recombine the beams to a single output beam 432. For purposes of further illustration of the invention, the 4×1 device of FIG. 4 can be schematically represented by FIG. 5 showing four inputs 514a,b,c,d and a single output 532.

Figure 6:
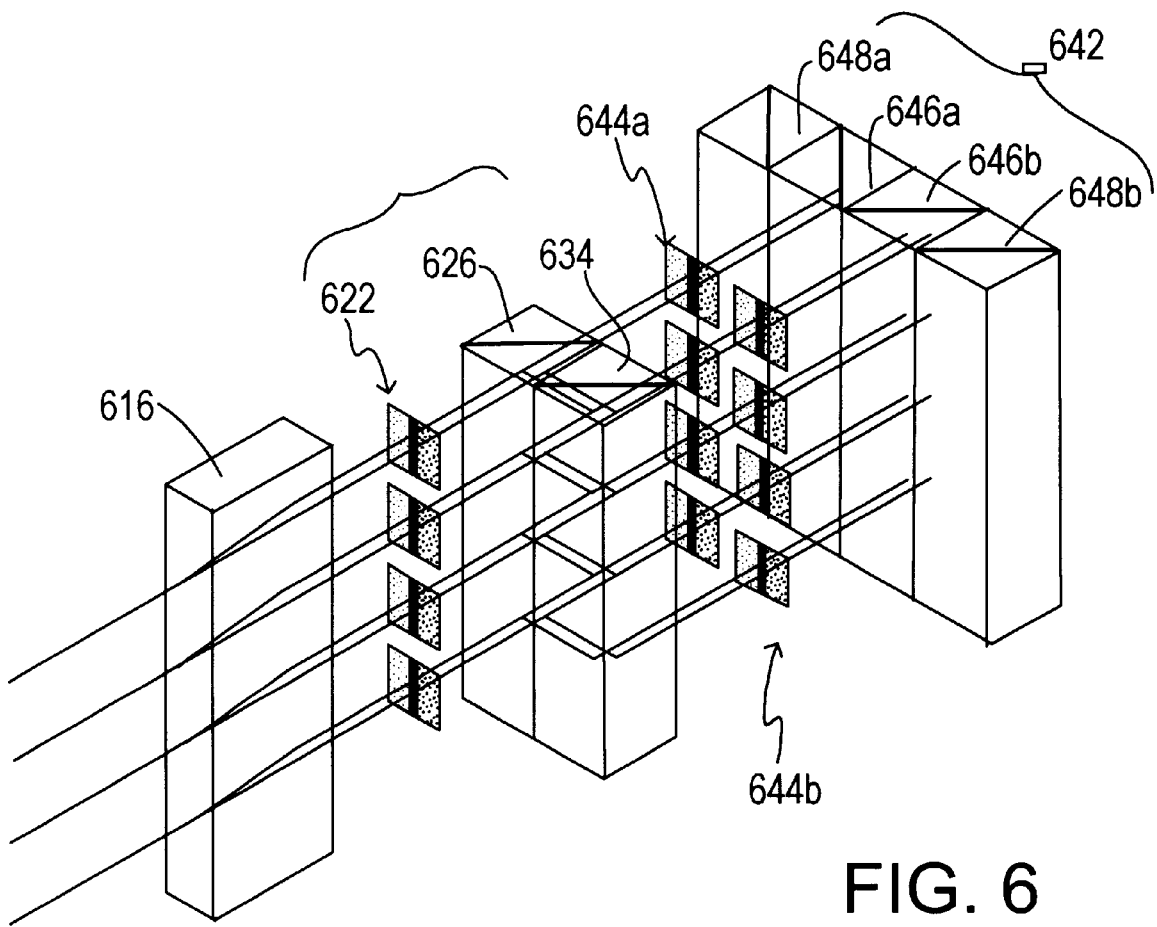
FIG. 6 is a perspective view of a 4:1×4 device according to an embodiment of the present invention.

As shown in FIG. 1, previous approaches for providing, e.g., a 4×4 switch involved providing four 1×4 devices. According to an embodiment of the present invention, four 1×4 devices of the type shown in FIG. 2 may be provided by providing four levels of devices similar to that depicted in FIG. 2. FIG. 6 provides a schematic illustration of such a four-level device to provide a 4:1×4 configuration. Although dimensioned to accommodate four levels of signals, the components of FIG. 6 include components similar to those depicted in FIGS. 2 and 4, including a birefringent element 616, a first set of liquid crystal pairs 622, a PCB/Prism pair 626, 634, forming a first splitting stage 638, and a second set 644a, 644b of liquid crystal pairs and two PCB/prism pairs 246a,b, 248a,b froming a second splitting stage 642.

Similarly, it is possible to place a plurality (e.g., four) of the devices of FIG. 4 adjacent one another to provide a 4:4×1 system.

Figure 7:
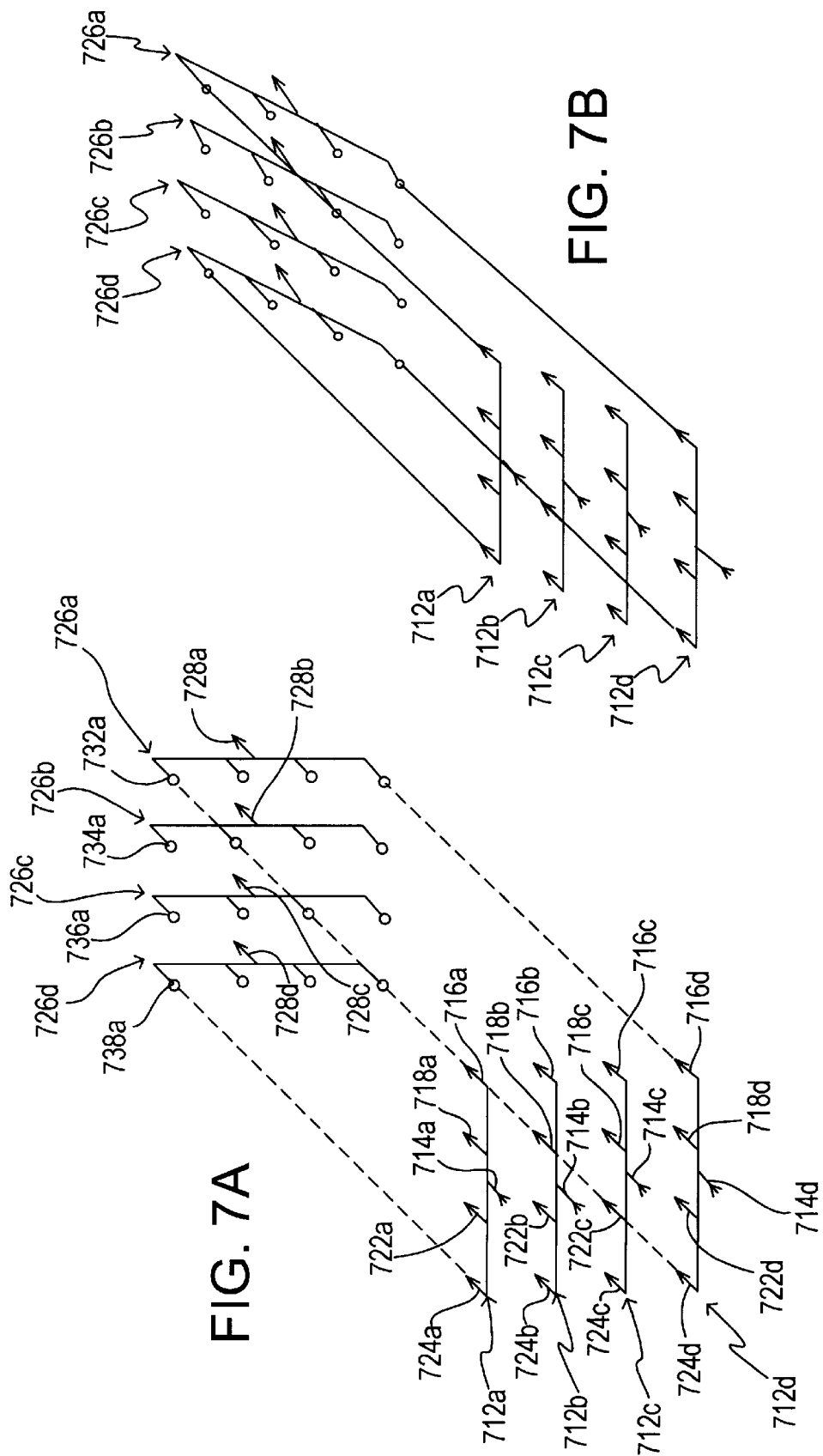
FIG. 7A is a schematic depiction of a 4:4×4 switch with orthogonal input and output arrangements according to an embodiment of the present invention.
FIG. 7B is a schematic depiction of a 4:4×4 switch with skewed input and output arrangements according to an embodiment of the present invention.

In order to use the 4:1×4 and 4:4×1 devices as described for achieving the functionality of FIG. 1, but without the need for providing optical fibers 112, the devices may be configured such that the 4:1×4 devices are positioned in a first orientation such as being stacked vertically (generally as depicted in FIG. 6) while the 4:4×1 devices are positioned in an angled, preferably orthogonal, relation (with respect to the relation of the 4:1×4 devices) such as being positioned horizontally or side by side. Using the schematic depiction of FIGS. 3 and 5, the resulting fiberless 4×4 switch is shown schematically in FIG. 7A. Each of the four 1×4 devices 712a,b,c,d receives one of four inputs 714a,b,c,d and provides four outputs each to define an array of 16 possible output positions 716a,b,c,d, 718a,b,c,d, 722a,b,c,d, 724a,b,c,d. In a similar, but orthogonally arranged fashion, the 4:4×1 devices 726a,b,c,d each define an output line 728a, b,c,d. The four inputs 732a–d, 734a–d, 736a–d, 738a–d for the 4:4×1 devices define 16 positions in a 4×4 array which are aligned with corresponding ones of the output pathways of the 4:1×4 devices. Conveniently, to achieve the alignment of the 4:1×4 output paths and the 4:4×1 input pads, the 4×4 output array of the 4:1×4 device and the 16 input paths of the 4:4×1 devices are each positioned to define a square array (with substantially identical spacing). Other arrangements are possible, such as skewed arrays as depicted in FIG. 7B, non-linear arrangements and the like.

As can be seen from FIG. 7A, by properly selecting among the four output paths for each of the 4:1×4 devices 712a–d, an optical input signal in any or each of the input lines 714a–d can be routed to a desired one of the 4×1 devices 726a,b,c,d and thus to a desired one of the output line 728a–d. For example, if it is desired to route an optical signal from input line 714a to output line 728c, the 1×4 device 712a is configured (by switching the LC devices 222, 244a, 244b in the depiction and configuration of FIG. 2) such that the signal on input line 714a is routed to the output position 722a which is aligned with the corresponding input position 736a of the third 4×1 device 726c thus routing the signal to output line 728c as desired.

Figure 8:
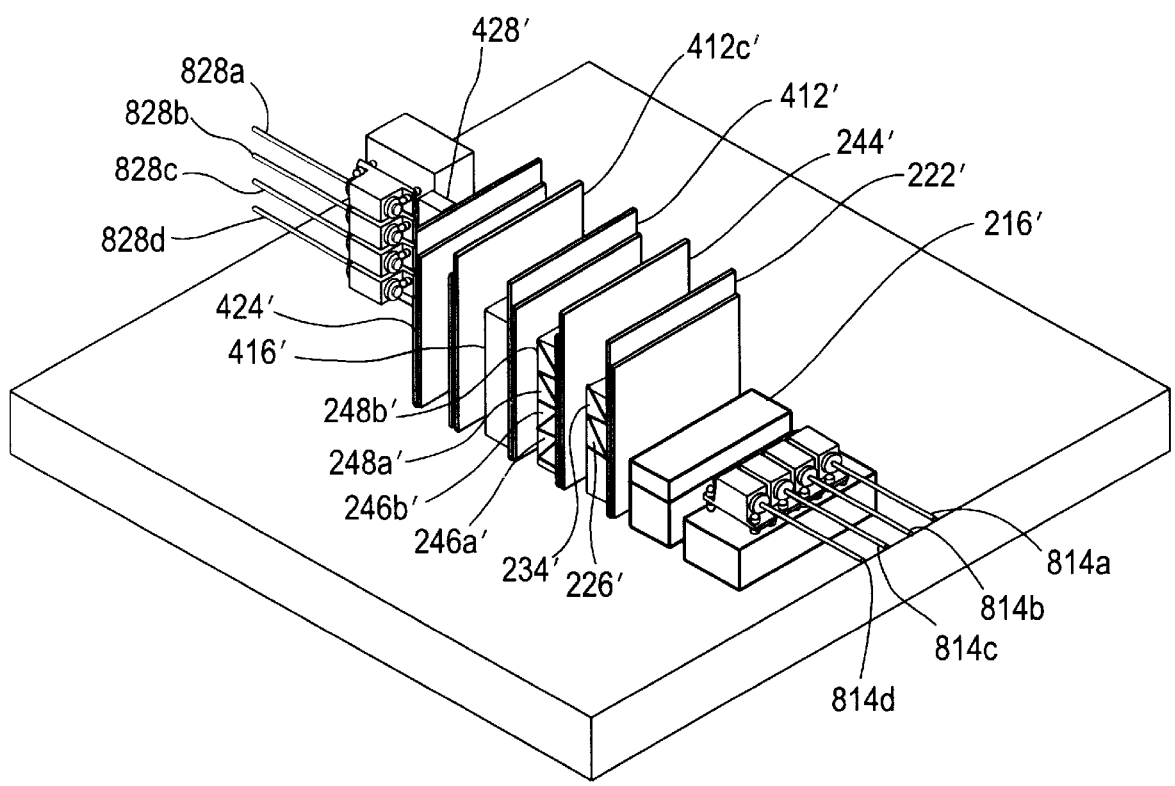
FIG. 8 is a depiction of a 4×4 switch according to an embodiment of the present invention.

FIG. 8 depicts a device corresponding to the schematic depiction of FIG. 7A. In FIG. 8, input pathways 814a,b,c,d are horizontally positioned rather than vertically positioned, and output lines 828a,b,c,d are vertically positioned rather than horizontally positioned. In accordance with the configuration of the 1×N device of FIG. 2, the input beams are provided to a calcite crystal 216' and the resultant beam pairs are controlled by a liquid crystal pixel array such as providing a controllable pixel pair for each of the four beam pairs on a substrate 222'. Two polarization beam splitters 226' and 234' provide output beams along one of two pathways (for each of the four inputs) and a controllable liquid crystal pixel array 244' selects or controls polarization of the resultant output. This output is then provided to a second stage of polarization beam splitters 246a', 246b' and prisms 248a', 248b' to supply the output of the 4:1×4 device on one of four selectable levels for each of the four beam pairs. The selected level controls or determines to which of the four output paths 828a–d, the signal from each respective input path will be provided. A 4×1 device may be used to route a signal to the desired output termina. Such a device may include an LC pixel array 412', a prism 416' and PCB device region (not shown), second liquid crystal pixel array 412c' providing input to a second prism and PCB device (not shown), a final liquid crystal pixel array 424' and a combiner such as a calcite crystal 428'.

Figure 12:
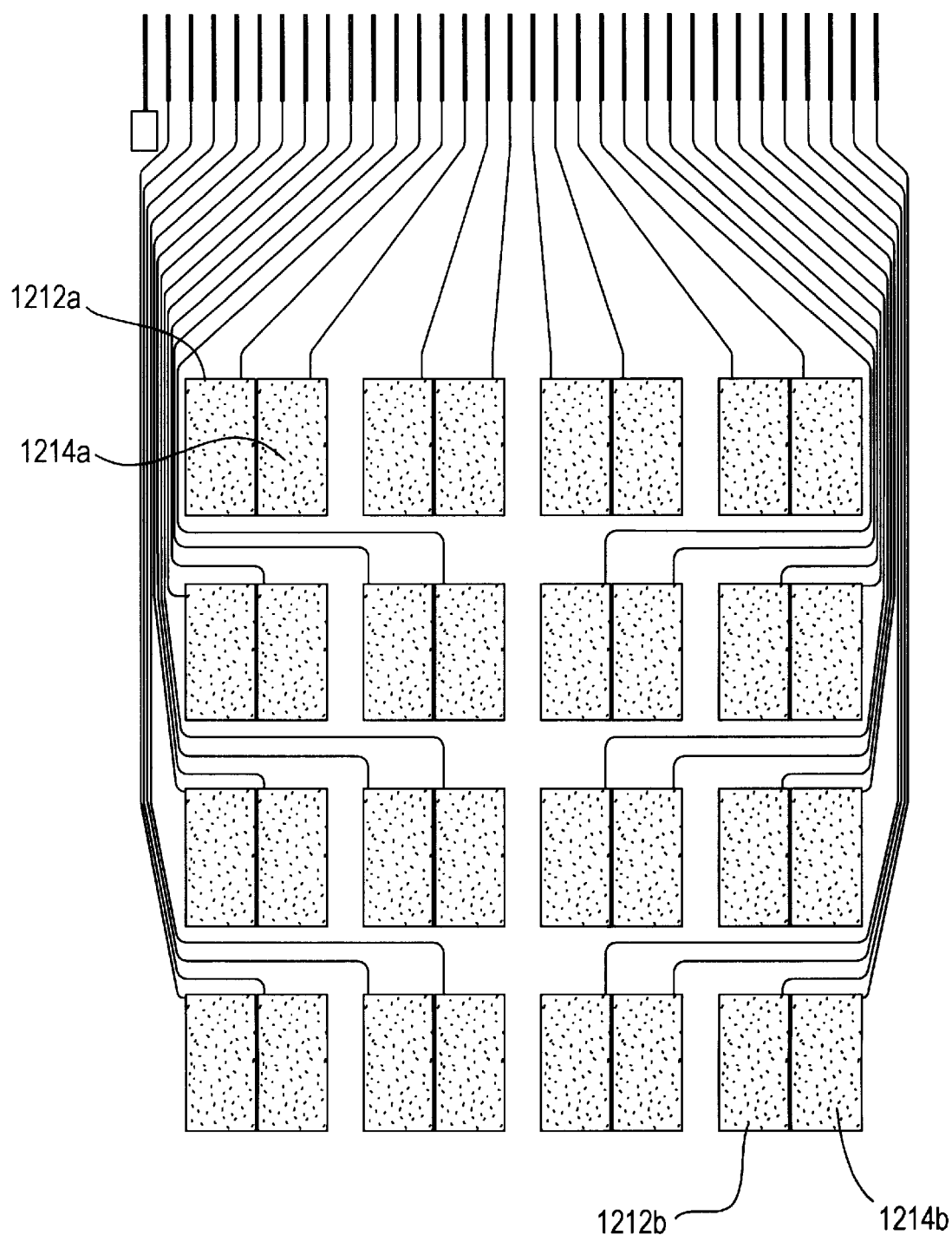
FIG. 12 is a plan view of an LC pixel array according to an embodiment of the present invention.
Figure 13:
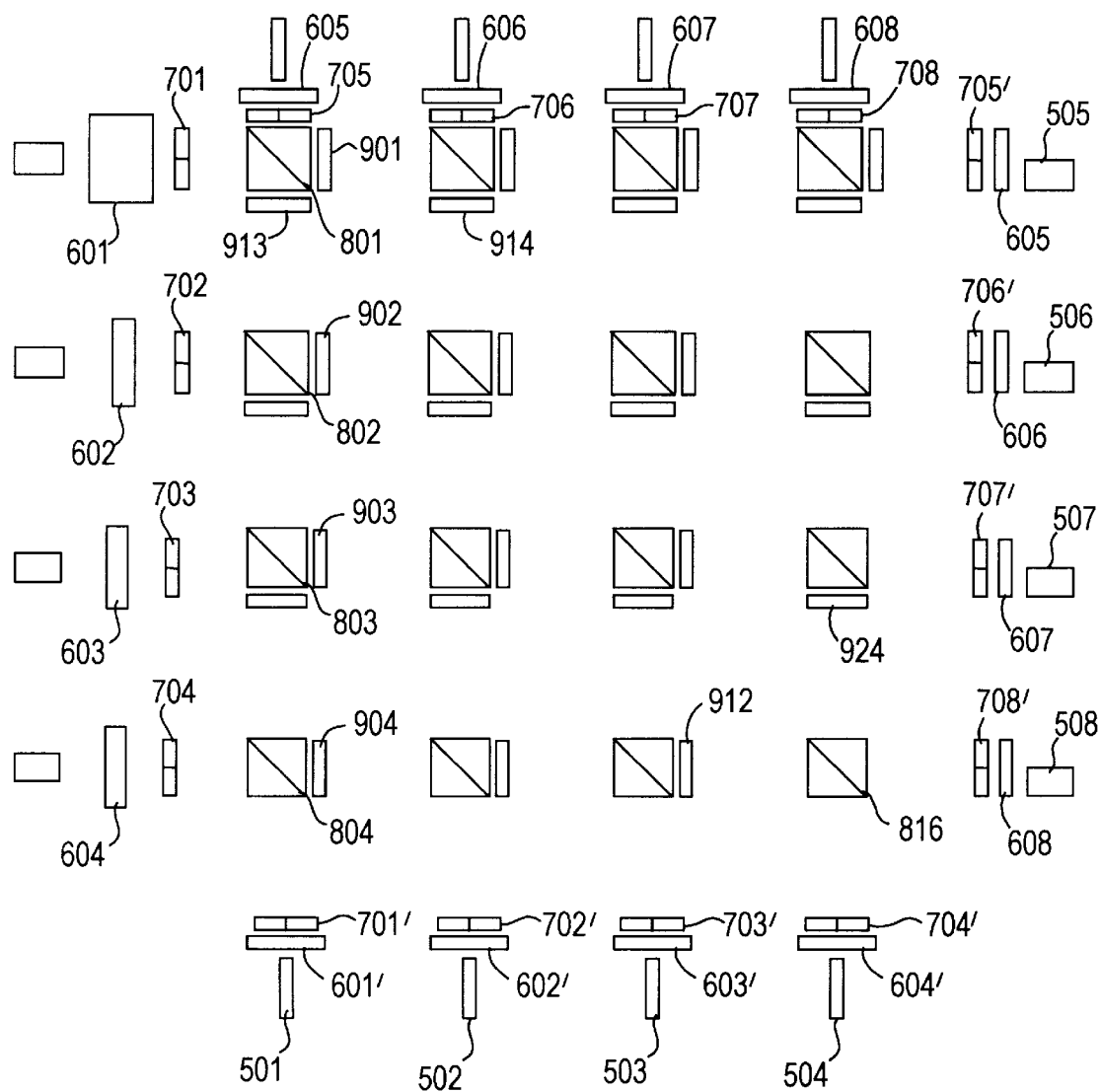
FIG. 13 is a plan view of a 4:2×2 switch array.

As noted above, one advantageous feature of the embodiment of FIGS. 2–8 is the reduction of the number of components such as by eliminating the need for numerous optical fibers 112 (FIG. 1). The embodiment depicted in FIGS. 9–12 also achieves a reduction of the number of components. In this embodiment, component reduction is at least partially facilitated by integrating one or more optical components such as a PBS device. In order to appreciate the manner in which integration, according to this embodiment, serves to reduce the number of components, comparison will be made to a substantially non-integrated device such as that depicted in FIG. 13. In the device of FIG. 13, a 4×4 routing switch uses a two-dimensional network or array of 16 polarized beam splitters 801–816, etc. Associated with each input are birefringent elements 601 through 608 and a polarization rotator pixel pair 701 through 708 which operate substantially as the corresponding components described in the embodiments above. The beam pairs enter the network of polarized beam splitters where they are routed to the desired output ports 501 through 508 by controlling the states of appropriate polarization rotator array 701 through 708 and polarizers 901–924 associated with each of the polarization beam splitters 801–816 Each output port includes a polarization rotator array 701' through 708' that returns the beam pair to orthogonal polarizations, and a final birefringent element 601'–608' that combines the orthogonally-polarized pair of beams at the output port.

As seen from FIG. 13, this embodiment involves use of a plurality of different polarization beam splitters (16 such polarization beam splitters in the embodiment of FIG. 13) and a plurality of polarizers 901–924. The provision of a relatively large number of separate components which must be properly aligned with respect to one another and must each be mounted in the desired alignment and, possibly, maintained or repaired, imposes relatively large assembly and maintenance costs.

Figure 9A:
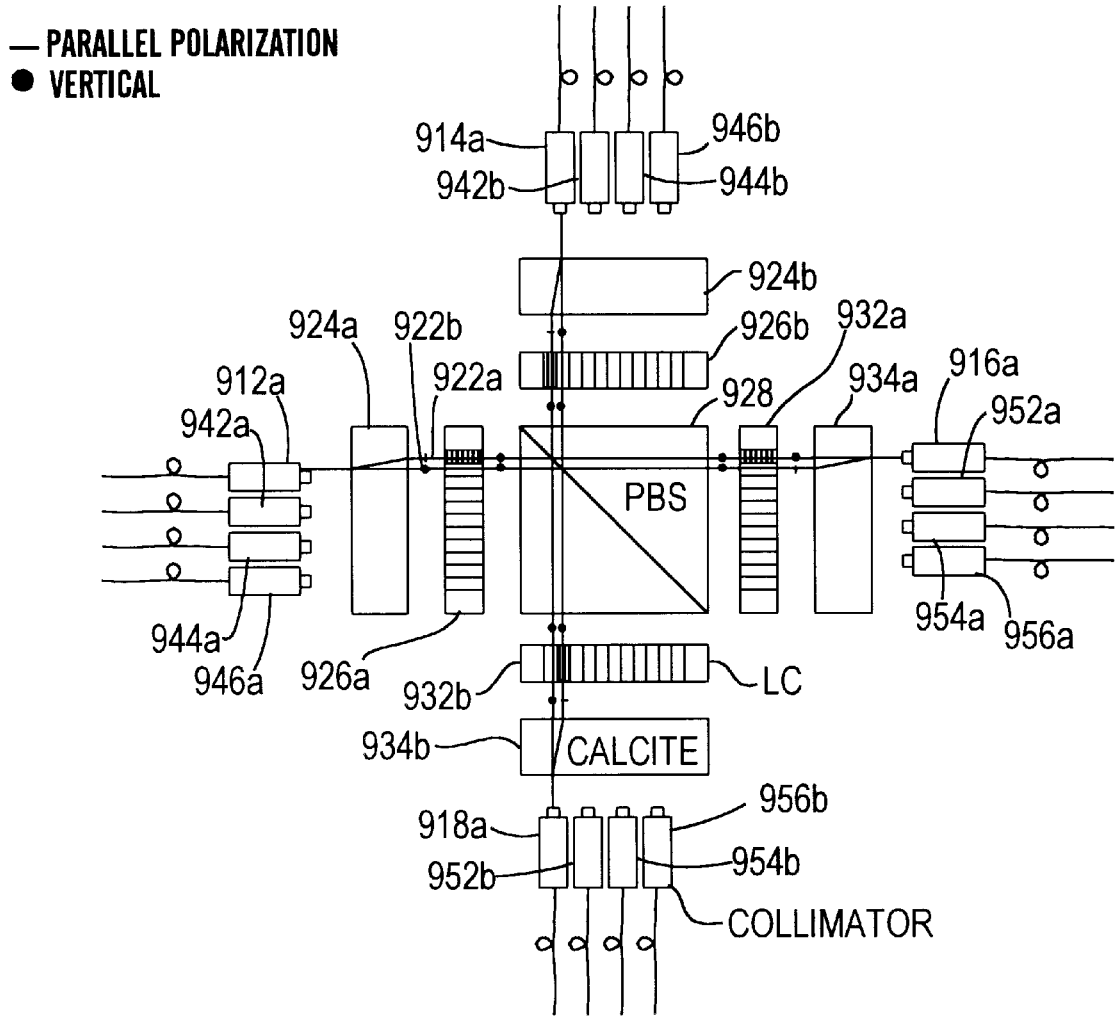
FIGS. 9A and B are schematic plan views of 4:2×2 integrated switch arrays at two different operating states, respectively, according to an embodiment of the present invention.
Figure 9B:
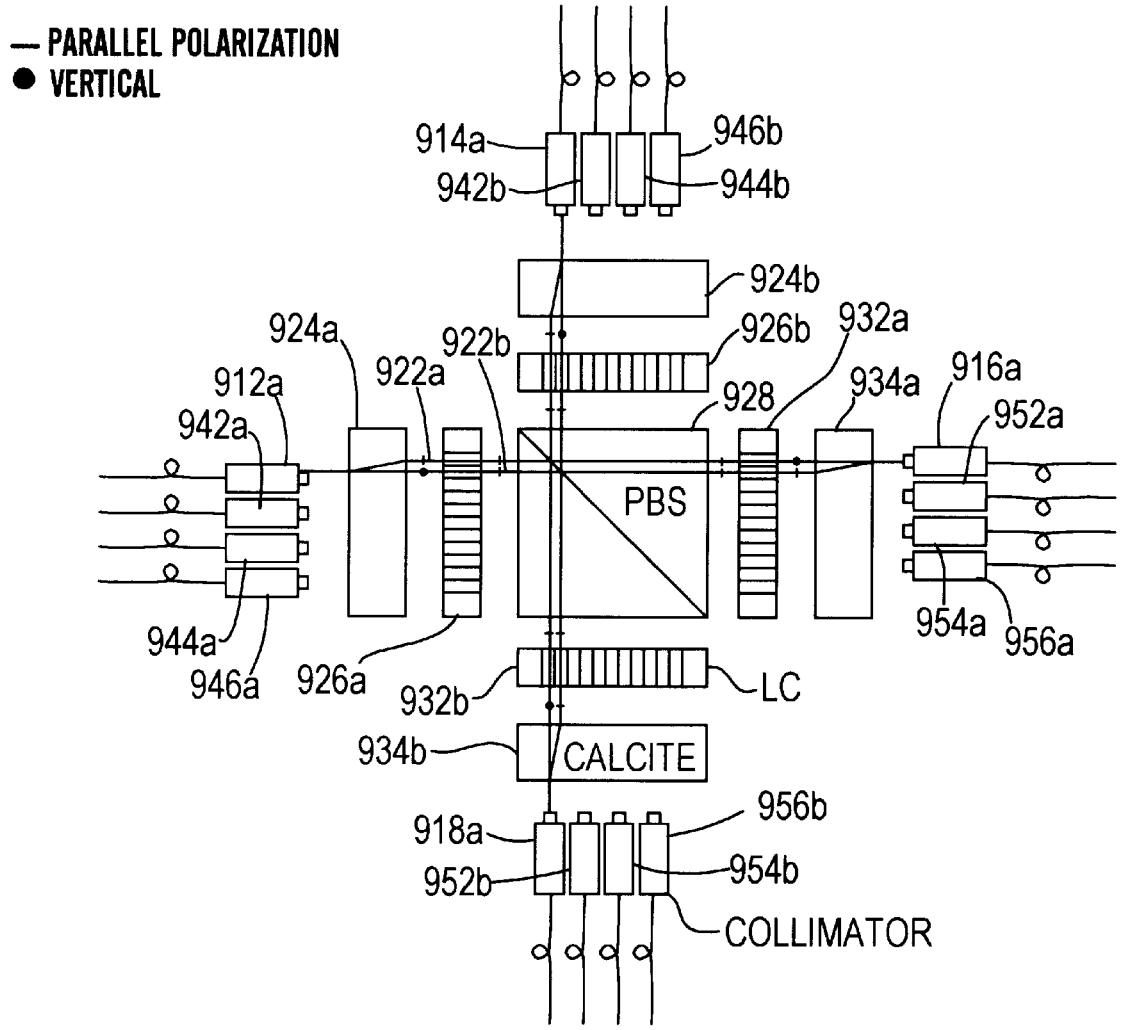

FIG. 9A, in contrast, depicts a device which provides a number of 2×2 LC switches (in particular, 4:2×2 switches) but which requires only a single polarization beam splitter, only four multi-pixel liquid crystal arrays, and only four birefringent elements, such as calcite crystals. Operation of the device of FIG. 9 can be understood by first describing a single one of the 4:2×2 switches. As noted above, a 2×2 switch receives input from either or both of first and second inputs and routes each of these inputs to first or second outputs. The device can be configured, as depicted in FIG. 9A, such that a first input 912a is routed to a first output 916a while a second input (if present) 914a is routed to a second output 918a or may be configured, as depicted in FIG. 9B, such that the first input 912a is routed to the second output 918a and the second input 914a (if present) is routed to the first output 916a.

These two configurations can be understood by a description of the optical pathways for each of these two input signals in each of the two configurations. In the first configuration (FIG. 9A), output 912a is split into horizontally and vertically polarized beams 922a, 922b by a birefringent element 924a. Birefringent element 924b performs a similar operation on the beam provided from the second input 914a. The first and second beams 922a, 922b are provided to first and second pixels of a liquid crystal array 926a with the first and second pixels being controlled so as to be in opposite states (one active while the other is inactive) such that the first and second beams output from the liquid crystal array have the same polarization. In one state of the first pixel pair the polarization will be vertical (FIG. 9A), and in the other state of the first pixel pair the polarization will be horizontal (FIG. 9B). The second liquid crystal array 926b performs a similar operation on the beams originating from the second input 914a. The polarization beam splitter 928 is, in the depicted configuration, configured such that a horizontally polarized beam (FIG. 9B) will be passed straight through to impinge on a second pixel pair of liquid crystal array 932a, controlled so as to change polarization of one of the beam pair in such a manner that the beam pair will be recombined by birefringent element 934a, so that the recombined beam is provided at output port 916a as desired. The polarization beam splitter 928 is of a nature such that if the be pair from input 912a is manipulated (e.g., by liquid crystal pixel pair 926a) so that the polarization of the beam pair is vertical (FIG. 9A), such beam pair will be diverted, e.g. by 90° so as to be directed to first and second pixels of a liquid crystal array 932b, controlled so as to change polarization of one of the beam pair in such a fashion that birefringent element 934b recombines the beams to provide the output to the second output port 918a. Similarly, if the beam pair originating from second input port 914a is manipulated to have a vertical polarization (FIG. 9A), the beam pair will be diverted to the liquid crystal array 932a birefringent element 934a and recombined to be provided to the first output port 916a.

As depicted in FIGS. 9A and B, the first birefringent element 924a is sized, configured and positioned to receive not only light from the first input port 912a but also from third, fifth and seventh input ports 942a, 944a, 946a, operating, with respect to these beams, substantially in the same way as described above with respect to beams originating at the first input port 912a. Birefringent element 924b is sized, configured and positioned to receive optical signals from fourth, sixth and eighth input ports 942b, 944b, 946b and operates, with respect to these signals, in a fashion similar to that described above in connection with signals received from the second input port 914a. Thus, birefringent elements 924a and 924b are integrated elements in the sense that only a single birefringent device is needed to operate with respect to a plurality of different input ports (as opposed to the configuration of FIG. 13 where a separate birefringent device 601, 602, 603, 604 is provided with respect to each input port and is thus substantially non-integrated). Similarly, birefringent elements 934a, 934b are integrated in the sense that a single birefringent device is sized, configured and positioned to operate with respect to a plurality of output ports 952a, 954a, 956a, 952b, 954b, 946b.

Although the liquid crystal arrays 926a, 926b, 932a, 932b include a plurality of pixels which are (preferably pair-wise) separately controllable, these items are preferably integrated in the sense that they are provided with all of the plurality of pixels on a single device or substrate so as to afford the advantages of integration noted above (e.g., reduction in materials, assembly and maintenance costs). One example of an LC array is shown in FIG. 12. Additional savings for the device of FIG. 9 can be achieved by configuring the apparatus in a substantially symmetric configuration such that two or more and, preferably, all, of the birefringent devices are similarly sized and shaped and can be interchanged and, preferably two or more and more, preferably all, of the liquid crystal arrays are substantially identical in configuration and shape and can be interchanged with one another. Such exploitation of the symmetric configuration further reduces the number of separate parts which must be kept on hand in an assembly process, maintenance or repair process and the like. Integration as described herein provides for reduction in costs and time of design and assembly or manufacture, e.g. because of the resultant simplification of alignment requirements or operations (aligning a single component, rather than multiple components). Furthermore, because of the interchangeability, assembly errors are reduced since it makes no difference whether a particular LC array is mounted in any of the four available positions.

After the beam originating at the third input port 942a is operated on by the birefringent device 924a, the resultant beam pair is operated on by a pixel pair of the LC array 926a and the resultant vertically or horizontally polarized beam pair is provided to the PBS 928 which is sized, configured and positioned to receive the beams originating from all of the input ports 912a, 914a, 942a, 942b, 944a, 944b, 946a, 946b and to pass through or divert the beams, according to the polarization of the beams (as determined by the state of corresponding pixel pairs of the LC arrays 926a, 926b). Accordingly, as can be seen from FIG. 9, the entire 4:2×2 switch can be provided using only a single polarization beam splitter if the beam splitter is properly sized, configured and aligned with respect to the other components, as depicted in FIG. 9.

Figure 10:
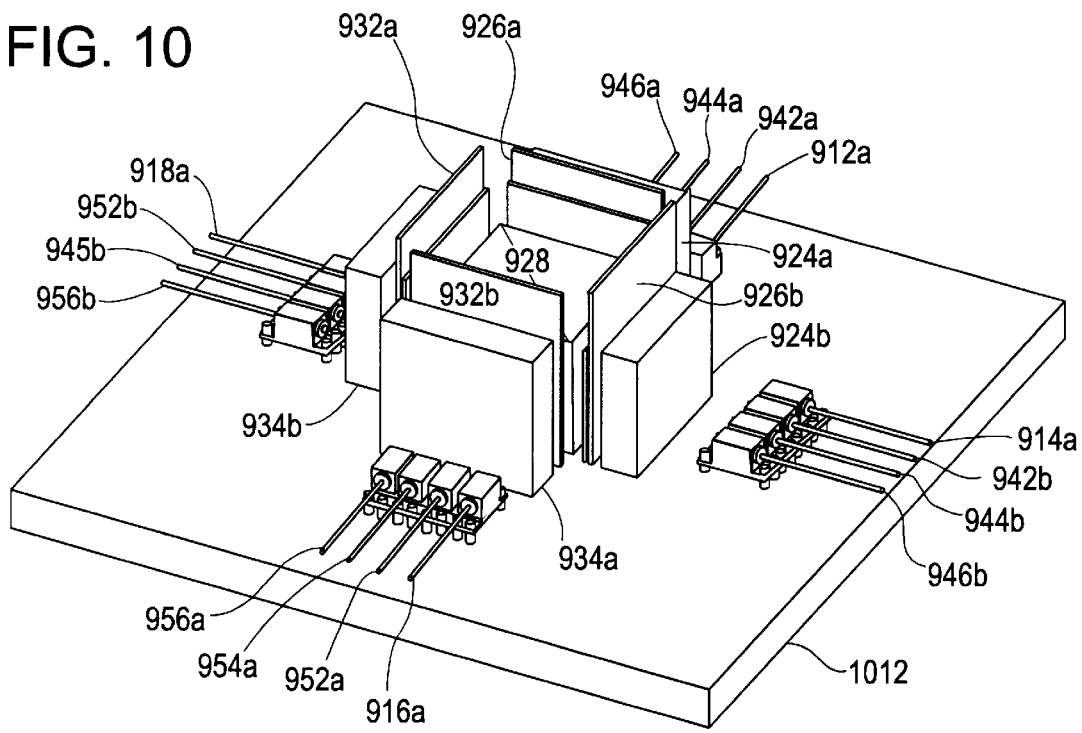
FIG. 10 is a perspective view of 4:2×2 switch array according to an embodiment of the present invention.
Figure 11:
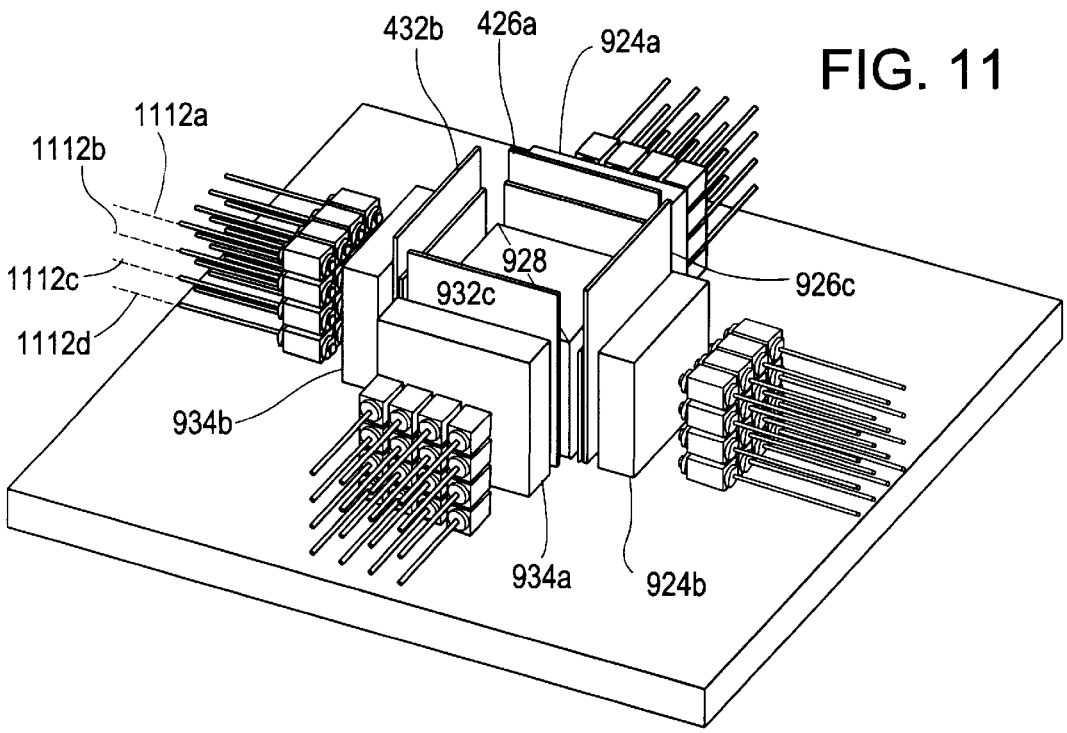
FIG. 11 is a perspective of a 16:2×2 switch according to an embodiment of the present invention.

FIG. 10 depicts the configuration of a device that may be provided in accordance with the embodiment of FIG. 9. A base 1012 is used to mount input port devices 912a, 914a, 942a, 944a, 946a, 942b, 944b, 946b. Input birefringent elements 924a, 924b are positioned between the input ports and LC arrays 926a, 926b. As described above, the LC arrays 926a, 926b contain pixels positioned and controlled (e.g. in response to binary and/or address control signals) to provide polarizations to beam pairs such that the polarization beam splitter 928 upon receiving all of the input beam pairs, correctly directs the beam pairs to the desired respective output ports 918a, 916a, 952a, 954a, 956a, 952b, 954b, 956b after passing through output liquid crystal pixel arrays 932a, 932b and output birefringent elements 934a, 934b. Although the degree of integration depicted in FIG. 10 is believed to be useful for reasons described above, an even greater degree of integration can be provided by configuring a three-dimensional switch array, positioning additional layers of switches at planes above that depicted in FIG. 10. For example, as depicted in FIG. 11, if a total of four planes of 4:2×2 switches are stacked vertically 1112a, 1112b, 1112c, 1112d, a 16:2×2 switch array is provided still being highly integrated, at least in the sense that a single polarization beam splitter 928 and four (each) LCD arrays 926a, 926b, 932a, 932b and four birefringent devices 924a, 924b, 934a, 934b are used in the depicted configuration. As described above, preferably the LCD arrays are substantially integrated and substantially identical such as depicted in FIG. 12 providing 16 pixel pairs with control lines for controlling the pixels for achieving the polarizations as described above 1212a, 1214a through 1212b, 1214b.

Figure 14:
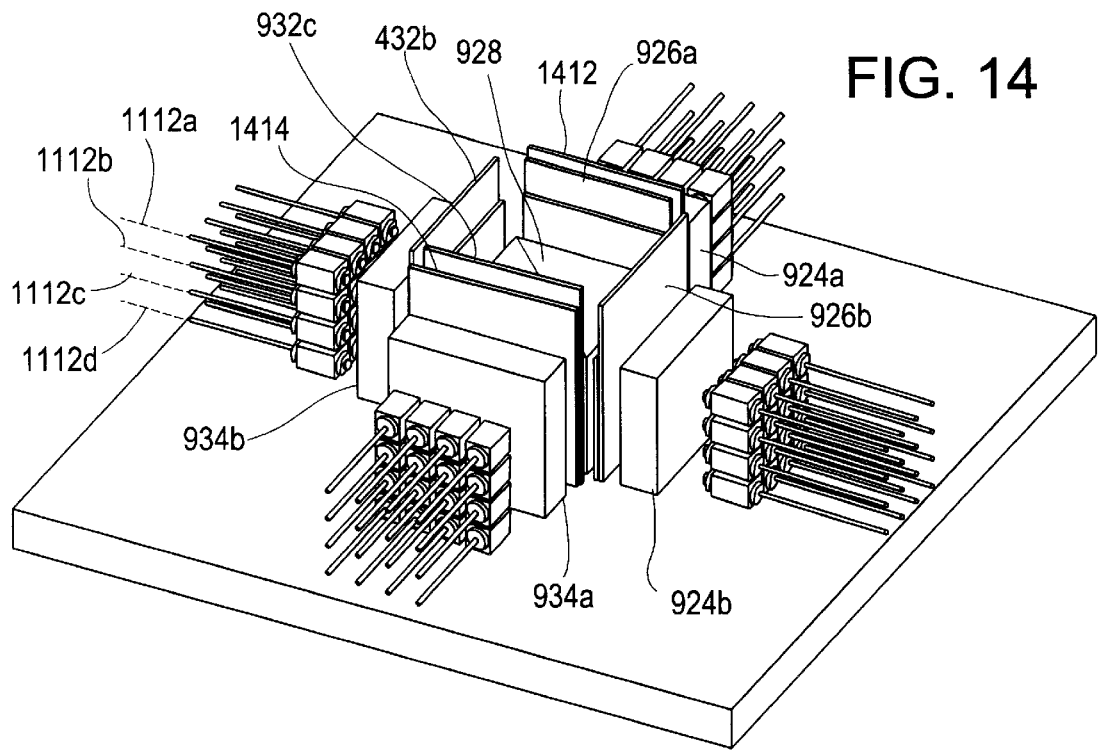
FIG. 14 is a perspective view of a 2×2 array with a blocking feature, according to an embodiment of the present invention.

FIG. 14 depicts a device which is generally similar to the device of FIG. 11 but which includes an input polarizer 1412 between the input birefringent device 924a and the input LC array, and a polarizer 1414 between the output LC array 932a and the output birefringent element 934a, e.g. for blocking "leakage" arising from imperfect or incomplete polarization rotation.

Figure 15:
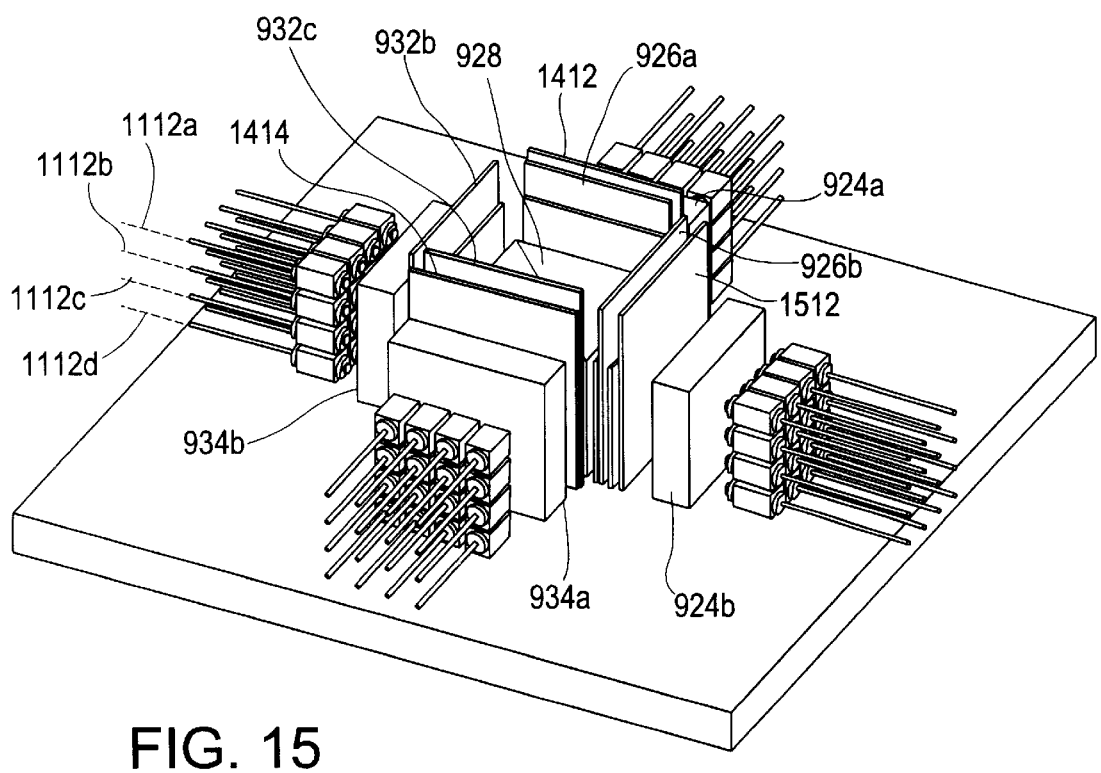
FIG. 15 is a perspective view of an integrated 2×2 switch array with optical power regulation capability, according to an embodiment of the present invention.

FIG. 15 depicts a device which is generally similar to the device of FIG. 14, but which includes a single-pixel liquid crystal array 1512 positioned between input birefringent device 924b and the input LC device 926b. The single-pixel liquid crystal array 1512 is similar to the previously-described LC device, depicted in FIG. 12, except that, rather than providing a pair of LC pixels for each of the sixteen signal positions, a single controllable LC pixel is provided at each of the sixteen signal positions. The device of FIG. 15 can be used to provide optical power regulation capability, e.g. when the single pixels are operated in analog mode that is controlled (e.g in response to analog signals) to rotate polarization to a controllable degree.

Figure 16:
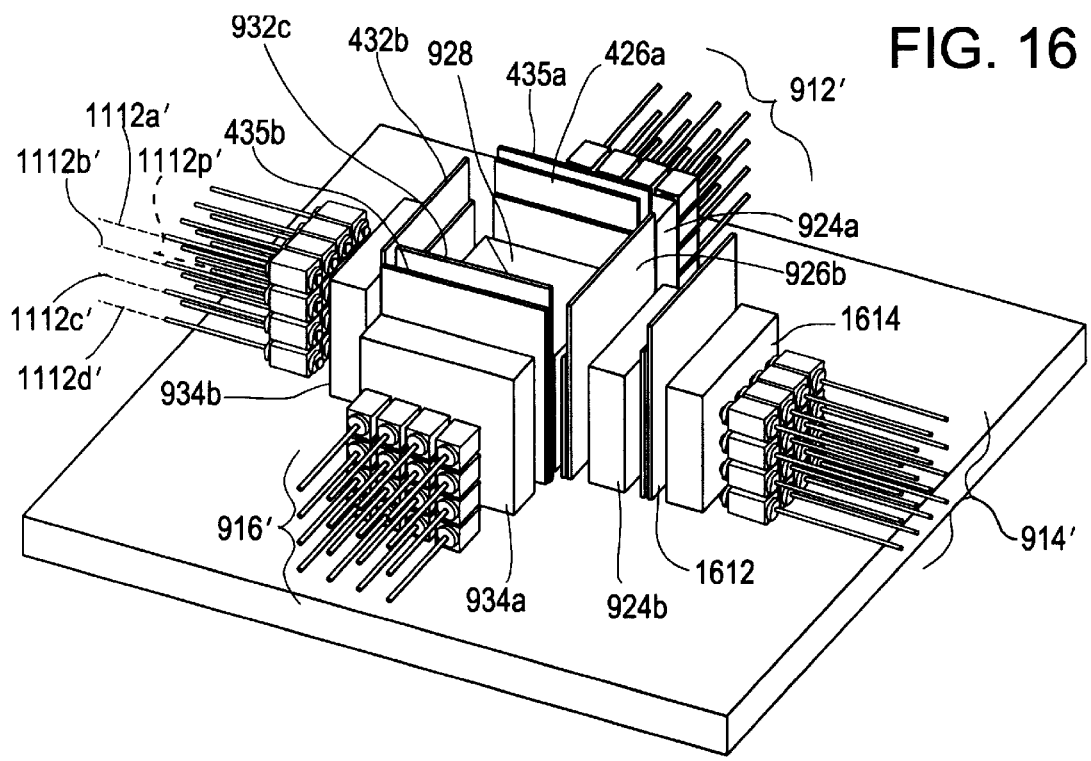
FIG. 16 is a perspective view of a 2×2 switch array with attenuation, according to an embodiment df the present invention.

FIG. 16 depicts a device which can be used in a add-drop fashion, i.e. in which signals can be sent directly from input ports (1112a'–1112p', in FIG. 16) to corresponding output ports 914', using a bridge mode, or, in an add-drop mode, signals from the input ports 1112a'–1112p' are sent to corresponding drop ports 916' and signals from the add ports 912' are sent to corresponding output ports 914'. In the embodiment of FIG. 16, a single-pixel LC array 1612 and a beam combiner 1614 act to perform an attenuation function, with the single-pixel LC array 1612 operating in an analog mode, as described above in connection with FIG. 15, that partially rotates polarization and achieves optical energy attenuation through the beam combiner 1614 which blocks passage of substantially all but a predetermined polarization direction.

Figure 17:
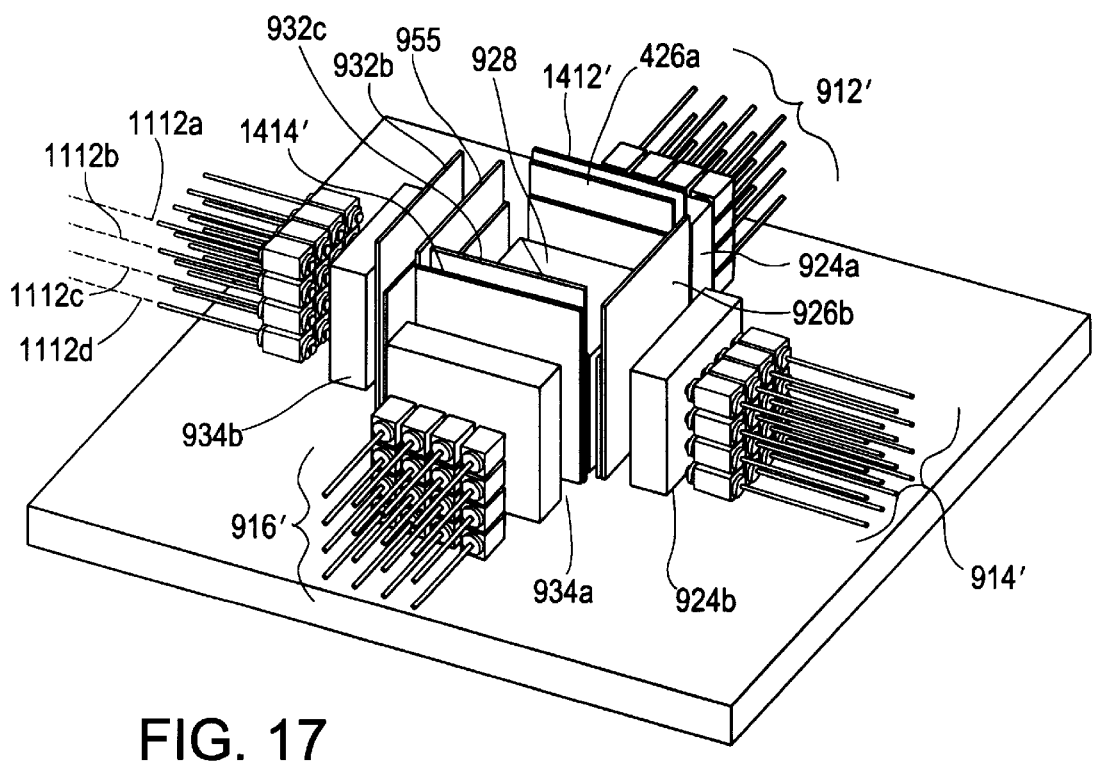
FIG. 17 is a perspective view of an add drop device with increased extinction ratio, according to an embodiment of the present invention.

FIG. 17 depicts a device similar to the device of FIG. 16, but in which two additional polarizers 1412', 1414' (similar to those described above in connection with FIG. 14) are used to reduce or eliminate crosstalk such as may arise from undesirable leakage of signals in the bridge state (in which state it is generally desired to have no connection of the add and drop ports), and increase the extinction ratio. A further feature depicted in FIG. 17 involves providing a single-pixel LC array 955 (similar to that described above in connection with FIG. 15), between the input LC array 932b and the beam splitter 928. By operating this array 955 in a analog fashion (to achieve a controllable degree of polarization rotation), it is possible to achieve bridge/add-drop combined functionality, such as to send the input signal, 50% to the output port 914' and 50% to the drop port 916', or in another desired ratio (such as 70%–30% or the like).

In light of the description above, a number of advantages of the present invention can be seen. The present invention can be used to reduce or eliminate certain components to provide for constructing switches or switch arrays while reducing the effort or expense of fabricating, assembling, maintaining or repairing such devices. For example, in the configurations depicted in FIGS. 2 through 8, it is possible to reduce or eliminate the use of optical fibers in order to achieve the desired switch array function. For an N×N switch, $N^2$ fiber interconnections can be eliminated. In the embodiment of FIGS. 9 through 17 it is possible to further reduce the number of components by integrating some or all of the optical components, including polarization beam splitters, liquid crystal pixel arrays and/or birefringent elements to provide for handling multiple inputs with a reduced number of components, and preferably to handle multiple inputs such as eight or more inputs while using only a single polarization beam splitter.

A number of variations and modifications of the invention can be used. Although examples have been provided with particular sizes of switch arrays, arrays with more or fewer switches can also be used. In general, beam paths that are described as relatively horizontally or vertically placed may be placed in other (opposite) relationships. In general, polarizations other than those described in the examples provided can be used, such as interchanging vertical and horizontal polarizations. It is, in general, possible to use some features of the invention without using others, such as by providing some components as integrated components without integrating other components.

The present invention, in various embodiments, includes components, methods, processes, systems and/or apparatus substantially as depicted and described herein, including various embodiments, subcombinations, and subsets thereof. The present invention, in various embodiments, includes providing devices and processes in the absence of items not depicted and/or described herein or in various embodiments hereof, including in the absence of such items as may have been used in previous devices or processes, e.g. for achieving ease and reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended the appended claims be construed to include alternative embodiments to the extent permitted.

What is claimed is:

1. An optical switch comprising a first input components having an input port and a plurality of output locations, said first input component being configured to controllably route an input optical signal to any of said plurality of output locations of said first input component, said plurality of output locations of said first input component defining a first spatial arrangement;

a second input components having an input port and a plurality of output locations, said second input component being configured to controllably route an input optical signal to any of said plurality of output locations of said second input component;

a first output component having at least first and second receiving locations, said first receiving location of said first output component aligned to receive optical signals from one of said plurality of output locations of said first input component, said second receiving location of said first output component aligned to receive optical signals from one of said plurality of output locations of said second input component, said first and second receiving locations of said first output component defining a second spatial arrangement, non-parallel with said first spatial arrangement, said first output component configured to route an optical signal received at either of said first or second receiving locations of said first output component to an output port of said first output component; and a second output component having at least first and second receiving locations, said first receiving location of said second output component aligned to receive optical signals from one of said plurality of output locations of said first input component, said second output component configured to route an optical signal received at either of said first or second receiving locations of said second output component to an output port of said second output component.

2. An optical switch, as claimed in claim 1, wherein said first spatial arrangement is substantially planar.

3. An optical switch, as claimed in claim 1, wherein said first spatial arrangement is substantially at an angle to said second spatial arrangement.

4. An optical switch, as claimed in claim 1 wherein said first spatial arrangement is substantially perpendicular to said second spatial arrangement.

5. An optical switch, as claimed in claim 1 wherein said input component comprises:

a birefringent element outputting first and second differently polarized beams; and at least one controllable optical diverter stage which receives light on a first path and diverts said light to a second, different, path in response to a control signal.

6. An optical switch, as claimed in claim 5, wherein said controllable diverter comprises a controllable liquid crystal rotator pixel pair and a polarization beam splitter.

7. An optical switch as claimed in claim 6 wherein said controllable diverter further comprises a prism.

8. An optical switch as claimed in claim 5 further comprising at least a second controllable optical diverter stage.

9. An optical switch as claimed in claim 1 wherein said optical switch is provided in the absence of using optical fibers for coupling said output locations to said receiving locations.

10. An optical switching method comprising providing a first input device for controllably routing an input optical signal from an input port to any of a plurality of output locations of said first input device, said plurality of output locations of said first input device defining a first spatial arrangement;

providing a second input device for controllably routing an input optical signal from an input port to any of a plurality of output locations of said second input device;

providing a first output device for routing an optical signal received at either of first or second receiving locations of said first output device to an output port of said first output device, said first receiving location of said first output device aligned to receive optical signals from one of said plurality of output locations of said first input component and said second receiving location of said first output device aligned to receive optical signals from one of said plurality of output locations of said second input device, said first and second receiving locations of said first output device defining a second spatial arrangement, positioning said first output device such that said second spatial arrangement is non-parallel with said first spatial arrangement;

providing a second output device for routing an optical signal received at either of first or second receiving locations of said second output device to an output port of said second output device, said first receiving location of said second output device aligned to receive optical signals from one of said plurality of output locations of said first input component; and receiving at least a first input optical signal in said first input device;

controlling said first input device to route said optical signal to one of said at least first and second output locations for receipt by an aligned receiving location of one of said first and second output devices for outputting at the output port of a desired one of said first and second output devices.

11. An optical switching method, as claimed in claim 10, wherein said first spatial arrangement is substantially planar.

12. An optical switching method, as claimed in claim 10, wherein said step of positioning comprises positioning such that said first spatial arrangement is substantially at an angle to said second spatial arrangement.

13. An optical switching method, as claimed in claim 10 wherein said step of positioning comprises positioning such that said first spatial arrangement is substantially perpendicular to said second spatial arrangement.

14. An optical switching method, as claimed in claim 10 further comprising:

receiving said input optical signal in one of said first input device and splitting into first and second differently polarized beams; and diverting said first and second beams to a second, different, path in response to a control signal.

15. An optical switching method as claimed in claim 10 wherein said optical switching method is provided in the absence of using optical fibers for coupling said output locations to said receiving locations.

16. An optical switch comprising:

at least a first birefringent integrated element for receiving first and second optical input signals at first and second spaced-apart locations thereof and outputting first and second beam pairs, each beam pair including oppositely polarized beams;

a liquid crystal array controllable in response to at least first and second control signals, said liquid crystal array including elements positioned to receive each beam of each of said first and second beam pairs and outputting first and second beam pairs wherein both beams of said first beam pair output by said liquid crystal array have a first beam pair polarization which depends on said first control signal and both beams of said second beam pair output by said liquid crystal array have a second beam pair polarization which depends on said second control signal;

an integrated polarization beam splitter positioned and configured to receive said first and second beam pairs at spaced-apart locations thereof, and configured to convey said first beam pair on a path for ultimate output at a first or second output port in dependence on said first beam pair polarization and to convey said second beam pair on a path for ultimate output at a third or fourth output port dependent on said second beam pair polarization.

17. An optical switch comprising:

at least a first birefringent integrated element for receiving a first set of N optical input signals at spaced-apart locations thereof and outputting a first set of N beam pairs, each beam pair including oppositely polarized beams, wherein N represents and integer greater than two;

at least a first liquid crystal array controllable in response to at least a first set of N control signals, said liquid crystal array including elements positioned to receive each beam of each of said first set of N beam pairs and outputting N beam pairs wherein both beams of each beam pair output by said first liquid crystal array have a polarization which depends on one of said first set of N control signals; and an integrated polarization beam splitter positioned and configured to receive said first set of N beam pairs output by said first liquid crystal array at spaced-apart locations thereof, and configured to convey each of said first set of N beam pairs on a path for ultimate output at a desired output port in dependence on the polarization of said each of said firs set of N beam pairs.

18. An optical switch as claimed in claim 17 wherein N is at least 4.

19. An optical switch as claimed in claim 17 wherein N is at least 16.

20. An optical switch as claimed in claim 17 wherein said liquid crystal array includes at least N liquid crystal pixel pairs positioned to be aligned with the beams of said first set of N beam pairs.

21. An optical switch as claimed in claim 20 wherein said pixel pairs are controlled such that the pixels in each pixel pair are in opposite states.

22. An optical switch as claimed in claim 20 further comprising:

at least a second birefringent integrated element for receiving a second set of M optical input signals at spaced-apart locations thereof and outputting a second set of M beam pairs, each beam pair including oppositely polarized beams, wherein M represents and integer;

at least a second liquid crystal array controllable in response to at least a second set of M control signals, said liquid crystal array including elements positioned to receive each beam of each of said second set of M beam pairs and outputting M beam pairs wherein both beams of each beam pair output by said second liquid crystal array have a polarization which depends on one of said second set of M control signals; and wherein said integrated polarization beam splitter is positioned and configured to receive said second set of M beam pairs output by said second liquid crystal array at spaced-apart locations thereof, and configured to convey each of said second set of M beam pairs on a path for ultimate output at a desired output port in dependence on the polarization of said each of said second set of M beam pairs.

23. An optical switch as claimed in claim 22 wherein M=N.

24. An optical switch as claimed in claim 22 further comprising a polarizer positioned to block light of a predetermined polarization in said second set of input signals from reaching said integrated polarization beam splitter.

25. An optical switch as claimed in claim 22 further comprising a polarizer positioned to block light of a predetermined polarization from reaching at least a first output port.

26. An optical switch as claimed in claim 22 further comprising an array of liquid crystal pixels which can be controlled to provide a variable and controllable degree of polarization rotation to an input beam, said array being located at a position which is between at least one of said integrated birefringent elements and one of said liquid crystal arrays.

27. An optical switch as claimed in claim 22 further comprising an array of liquid crystal pixels which can be controlled to provide a variable and controllable degree of polarization rotation to an input beam, said array being located at a position which is between said integrated polarization beam splitter and one of said liquid crystal arrays.

* * * * *